United States Patent
Ito et al.

(10) Patent No.: US 11,828,772 B2
(45) Date of Patent: Nov. 28, 2023

(54) SAMPLE, METHOD FOR MANUFACTURING SAMPLE, AND METHOD FOR MEASURING INFRARED ABSORPTION SPECTRUM

(71) Applicant: KIOXIA CORPORATION, Tokyo (JP)

(72) Inventors: Machiko Ito, Yokkaichi Mie (JP); Yuji Yamada, Kuwana Mie (JP); Takehiro Nakai, Yokkaichi Mie (JP)

(73) Assignee: Kioxia Corporation, Tokyo (JP)

( * ) Notice: Subject to any disclaimer, the term of this patent is extended or adjusted under 35 U.S.C. 154(b) by 0 days.

(21) Appl. No.: 17/882,456

(22) Filed: Aug. 5, 2022

(65) Prior Publication Data
US 2023/0236221 A1   Jul. 27, 2023

(30) Foreign Application Priority Data

Jan. 21, 2022 (JP) .................. 2022-007929

(51) Int. Cl.
*G01Q 30/02* (2010.01)
*G01N 21/35* (2014.01)
*G01Q 60/24* (2010.01)

(52) U.S. Cl.
CPC ............. *G01Q 30/02* (2013.01); *G01N 21/35* (2013.01); *G01Q 60/24* (2013.01)

(58) Field of Classification Search
CPC ......... G01Q 30/02; G01Q 60/24; G01N 21/35
See application file for complete search history.

(56) References Cited

U.S. PATENT DOCUMENTS

| | | | |
|---|---|---|---|
| 11,161,279 B2 | 11/2021 | Takahashi | |
| 2017/0373463 A1* | 12/2017 | Narumi | H01S 3/0405 |
| 2018/0052186 A1* | 2/2018 | Su | G01Q 30/02 |
| 2022/0349848 A1* | 11/2022 | Ohba | G02B 21/24 |

FOREIGN PATENT DOCUMENTS

| | | |
|---|---|---|
| JP | 2005324466 A | 11/2005 |
| JP | 2020011489 A | 1/2020 |

OTHER PUBLICATIONS

Yamawaki et al., "Development of SiH4 Alternative Source for PE-CVD SiN Film", Taiyo Nippon Sanso Technical Report, No. 32 (2013) p. 31-32 with English Translation, 4 pages. https://www.tn-sanso.co.jp/jp/rd/giho/pdf/32/tnscgiho32_11.pdf.

Taka et al.,"Development of High-quality Low-temperature (= 120C) plasma Enhanced CVD-SiN Films by Organosilane", Taiyo Nippon Sanso Technical Report, No. 34 (2015) p. 1-3, with English Translation, 6 pages. https://www.tn-sanso.co.jp/jp/rd/giho/pdf/34/tnscgiho34_03.pdf.

(Continued)

*Primary Examiner* — Nicole M Ippolito
(74) *Attorney, Agent, or Firm* — Kim & Stewart LLP

(57) ABSTRACT

A sample for atomic force microscopy-based infrared spectroscopy includes a substrate, a measurement portion provided on the substrate and having a first light absorption intensity when a light of a first wavelength is irradiated thereon, and a first film provided on the measurement portion and having a higher coefficient of thermal expansion than the measurement portion and a second light absorption intensity, which is less than the first light absorption intensity, when the light of the first wavelength is irradiated thereon.

20 Claims, 13 Drawing Sheets

(56) References Cited

OTHER PUBLICATIONS

"Quantification of hydrogen in SiN membrane by bond state C0301", MST (2015) with English Translation, 7 pages. htttps://www.mst.or.jp/casestudy/tabid/1318/pdid/281/Default.aspx.

"Determination of Cure Extent and Behavior of Resin" Toshiba (2022) with English Translation, 8 pages. https://www.nanoanalysis.co.jp/business/organic/11/.

"Measurement of refractive index and extinction coefficient in infrared region 2" Techno-Synergy Inc. (2011) with English Translation, 4 pages. http://www.techno-synergy.co.jp/nkd_appli/ex-SE560.html.

"Anasys nanoIR3" Bruker, Jun. 14, 2022, 10 pages. https://www.bruker.com/ja/products-and-solutions/infrared-and-raman/nanoscale-infrared-spectrometers/Anasys-hanoir3.html.

* cited by examiner

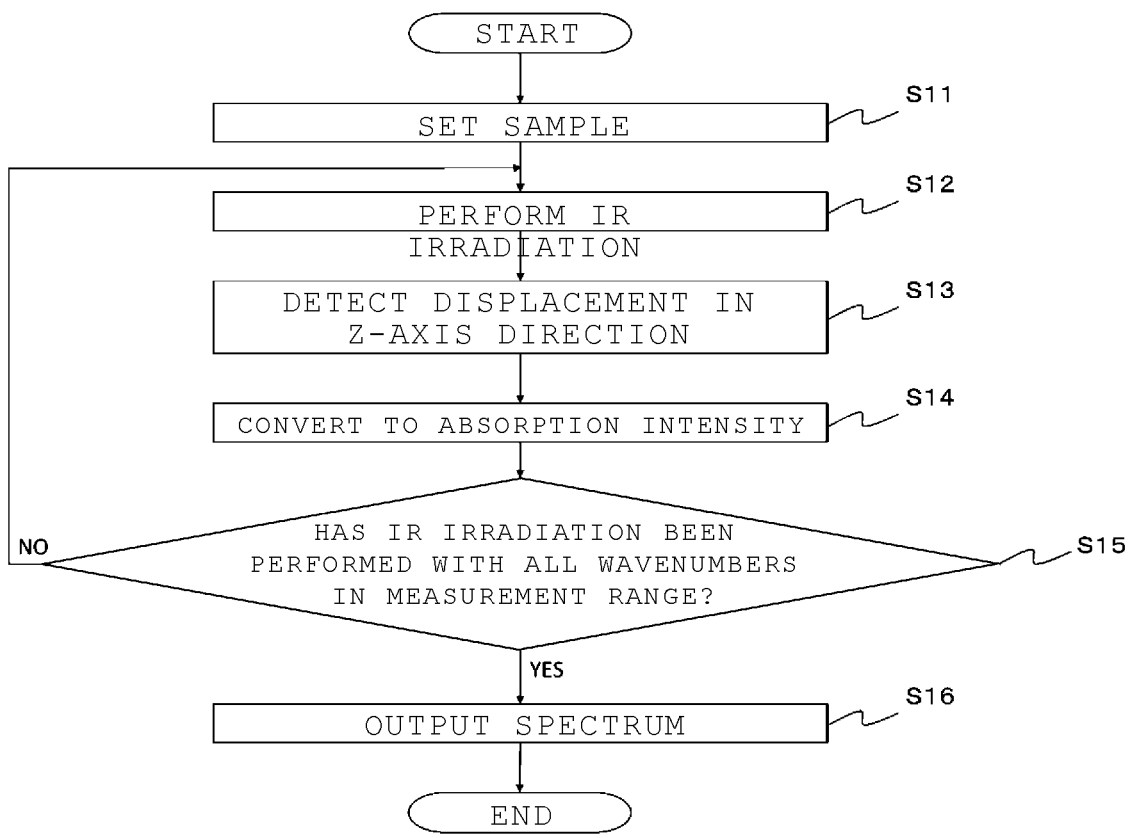

SAMPLE, METHOD FOR MANUFACTURING SAMPLE, AND METHOD FOR MEASURING INFRARED ABSORPTION SPECTRUM

CROSS-REFERENCE TO RELATED APPLICATION

This application is based upon and claims the benefit of priority from Japanese Patent Application No. 2022-007929, filed Jan. 21, 2022, the entire contents of which are incorporated herein by reference.

FIELD

Embodiments described herein relate generally to a sample, a method for manufacturing a sample, and a method for measuring an infrared absorption spectrum.

BACKGROUND

Atomic force microscopy-based infrared spectroscopy (AFM-IR), which is a combination of an atomic force microscopy and infrared spectroscopy, is known as a method for infrared absorption spectrum measurement for chemical bond analysis.

DESCRIPTION OF THE DRAWINGS

FIG. 5 is a flowchart showing a method for measuring the sample according to the first embodiment.

FIG. 6 is a table showing an example of an infrared absorption spectrum.

DETAILED DESCRIPTION

Figure 1:
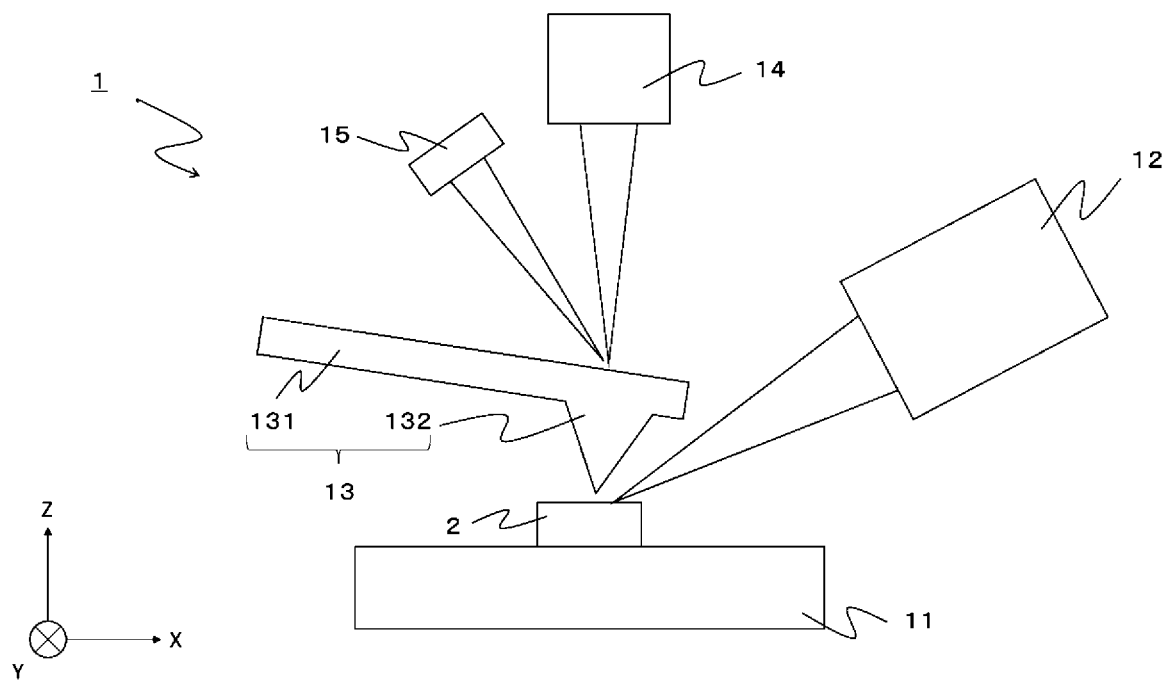
FIG. 1 is a diagram illustrating an example of the configuration of a measuring device used in embodiments.

In one embodiment of the present disclosure, the measurement sensitivity of a sample is improved.

In general, according to one embodiment, a sample for atomic force microscopy-based infrared spectroscopy includes a substrate, a measurement portion provided on the substrate and having a first light absorption intensity when a light of a first wavelength is irradiated thereon, and a first film provided on the measurement portion and having a higher coefficient of thermal expansion than the measurement portion and a second light absorption intensity, which is less than the first light absorption intensity, when the light of the first is irradiated thereon.

Hereinafter, embodiments for carrying out the disclosure will be described with reference to the drawings. The drawings are schematic and, for example, a thickness-plane dimension relationship, the ratio of the thicknesses of layers, and so on may differ from the actual ones. In addition, in the embodiments, substantially the same components are denoted by the same reference numerals with redundant description omitted.

1. First Embodiment

A first embodiment will be described with reference to FIGS. 1 to 6.

1.1. Configuration 1.1.1. Configuration of AFM-IR Device

FIG. 1 is a diagram illustrating an example of the configuration of an analysis device according to the first embodiment. As illustrated in FIG. 1, an AFM-IR device 1 includes a sample table 11, an IR irradiation unit 12, a cantilever 13, an AFM irradiation unit 14, and an AFM light receiving unit 15.

The sample table 11 holds a sample 2.

The IR irradiation unit 12 irradiates the sample 2 with, for example, an infrared pulsed laser. The IR irradiation unit 12 is capable of controlling the wavenumber (or wavelength, which is a reciprocal of the wavenumber) of the infrared pulsed laser using a control unit (not illustrated).

The cantilever 13 includes a support portion 131 and a probe unit 132. The support portion 131 supports the probe unit 132. The probe unit 132 detects the thermal expansion of the sample 2 attributable to infrared absorption. Specifically, the light energy absorbed when the emitted light having a certain wavenumber (or wavelength) resonates with the vibration frequency of the coupling type in a measurement portion 23 (not illustrated in FIG. 1) of the sample 2 to be described later is released as heat. The sample 2 is thermally expanded by the released heat. When the sample 2 thermally expands, the amplitude of the cantilever 13 changes and the thermal expansion of the sample 2 is detected. The amplitude of the cantilever 13 is proportional to the absorption intensity of the measurement portion 23 of the sample 2, and thus it is possible to obtain the infrared absorption spectrum of the measurement portion 23. The light in the present embodiment is, for example, infrared light.

The AFM irradiation unit 14 performs laser irradiation on, for example, the cantilever 13. The cantilever 13 reflects the emitted laser.

The AFM light receiving unit 15 receives, for example, the laser reflected by the cantilever 13. The amplitude of the cantilever 13 can be detected from the laser received by the AFM light receiving unit 15.

1.1.2. Configuration of Sample

Figure 2:
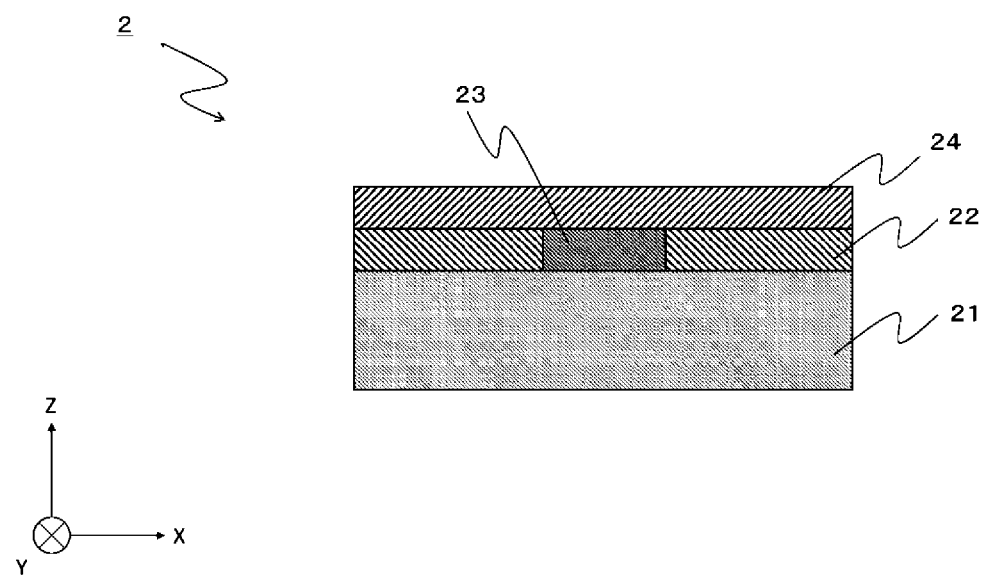
FIG. 2 is a diagram illustrating an example of the configuration of a sample according to a first embodiment.

FIG. 2 is a diagram illustrating an example of the configuration of the sample according to the first embodiment. Hereinafter, the configuration of the sample according to the first embodiment will be described with reference to FIG. 2.

As illustrated in FIG. 2, the sample 2 includes a substrate 21, a non-measurement portion 22, the measurement portion 23, and a surface film 24. The surface film 24 may be referred to herein as a film, a first film, and a second film. In addition, in the present embodiment, the substrate 21, the non-measurement portion 22, and the measurement portion 23 are a part of a semiconductor device. Although the substrate 21, the non-measurement portion 22, and the measurement portion 23 are a part of the semiconductor device in the present embodiment, the substrate 21, the non-measurement portion 22, and the measurement portion 23 may be any structure including an object of infrared absorption spectrum measurement.

The substrate 21 is, for example, silicon (Si).

The non-measurement portion 22 and the measurement portion 23 are provided on the substrate 21. The non-measurement portion 22 is provided adjacent to the measurement portion 23. The non-measurement portion 22 contains, for example, silicon nitride (SiN), silicon oxide (SiO2), or copper (Cu). In the present embodiment, the non-measurement portion 22 will be described as a material containing silicon nitride (SiN). The measurement portion 23 is a part including an object of infrared absorption spectrum measurement. The measurement portion 23 is a material containing, for example, silicon nitride (SiN). In addition, the measurement target in the present embodiment is a Si—H bond. The silicon nitride (SiN) has different properties depending on the content of the Si—H bond. Accordingly, the absorption intensity of the Si—H bond is measured using the AFM-IR device 1 and chemical bond state analysis is performed. In the present embodiment, the wavenumber of light, which is the reciprocal of its wavelength, in which Si—H bond absorption is observed, is in a range of 2200-2000 cm-1 (referred to herein as a "first wavenumber range"). The absorption intensity of absorption of the light having wavenumbers in the first wavenumber range in the measurement portion 23 is a first value. In other words, the first value as used herein is the absorption intensity of absorption of the light having wavenumbers in the range of 2200-2000 cm-1 in the measurement portion 23. In this embodiment, a material's absorbance of light having wavenumbers in a particular wavenumber range is an actual measured value. From the actual measured value of the material's absorbance of light having wavenumbers in a particular wavenumber range, an absorbance of light having same wavenumbers can be derived based on Lambert-Beer's law.

In addition, in the present embodiment, each of the non-measurement portion 22 and the measurement portion 23 is a material containing silicon nitride (SiN). Accordingly, it is preferable that the width of the measurement portion 23 in the X-axis direction exceeds 30 nm. When the width of the measurement portion 23 in the X-axis direction is 30 nm or less, there is a possibility that the silicon nitride (SiN) contained in the non-measurement portion 22 and the silicon nitride (SiN) contained in the measurement portion 23 cannot be spatially separated. In other words, the width of the measurement portion 23 in the X-axis direction is not limited thereto insofar as it is possible to distinguish between the non-measurement portion 22 and the measurement portion 23.

The surface film 24 is provided on the measurement portion 23. In the present embodiment, the surface film 24 is provided not only on the measurement portion 23 but also on the non-measurement portion 22. In the present embodiment, it is preferable that the surface film 24 is higher in coefficient of thermal expansion than the measurement portion 23. In addition, in the present embodiment, the absorption intensity of the light having wavenumbers in the first wavenumber range in the surface film 24 is a second value. In other words, the second value as used herein is the absorption intensity of the light having wavenumbers in the range of 2200-2000 cm-1 in the surface film 24. Preferably, the second value is less than the first value. More preferably, the second value is ¹⁄₁₀ or less of the first value. In addition, it is further preferable that the second value is ¹⁄₁₀₀ or less of the first value. Further, it is even more preferable that the second value is ¹⁄₁₀₀₀ or less of the first value. As the second value decreases compared to the first value, the effect of the surface film 24 on the infrared absorption spectrum of the light having wavenumbers in the first wavenumber range in the measurement portion 23 decreases.

In the present embodiment, the thickness of the surface film 24 in the Z-axis direction is preferably 5 nm or more and 2 um or less. When the thickness of the surface film 24 in the Z-axis direction is less than 5 nm, the sensitivity in measuring the infrared absorption spectrum of the measurement portion 23 may not be sufficiently improved. In addition, when the thickness of the surface film 24 in the Z-axis direction exceeds 2 um, the infrared pulsed laser emitted from the IR irradiation unit 12 may not reach the measurement portion 23. Further, the cantilever 13 may be incapable of detecting the thermal expansion of the surface film 24 attributable to the heat diffusion of the measurement portion 23 even when the infrared pulsed laser reaches the measurement portion 23. The thickness of the surface film 24 in the Z-axis direction is not limited thereto insofar as the sensitivity is sufficiently improved, the infrared pulsed laser reaches the measurement portion 23, and the cantilever 13 is capable of detecting the thermal expansion of the surface film 24 attributable to the heat diffusion of the measurement portion 23.

In the present embodiment, the surface film 24 is a material containing, for example, an epoxy resin that is a resin film. The epoxy resin is higher in coefficient of thermal expansion than the silicon nitride (SiN) contained in the measurement portion 23. In addition, when the surface film 24 is the material containing the epoxy resin, the second value can be less than the first value. In the embodiment, the surface film 24 is higher in coefficient of thermal expansion than the measurement portion 23 and the second value is less than the first value. Also, the measurement portion 23 is not limited to a material containing silicon nitride (SiN), and the surface film 24 is not limited to a material containing an epoxy resin. The measurement portion 23 may contain another material in addition to the silicon nitride (SiN). In addition, the surface film 24 may contain another material in addition to or in place of the epoxy resin, for example, a polycarbonate resin, a polyethylene resin, or the like. Although an example in which the surface film 24 contains a material that is a resin film has been described, it is not limited to the resin film insofar as the surface film 24 is higher in coefficient of thermal expansion than the measurement portion 23 and the second value is less than the first value.

1.2. Sample Manufacturing Method

Figure 3:
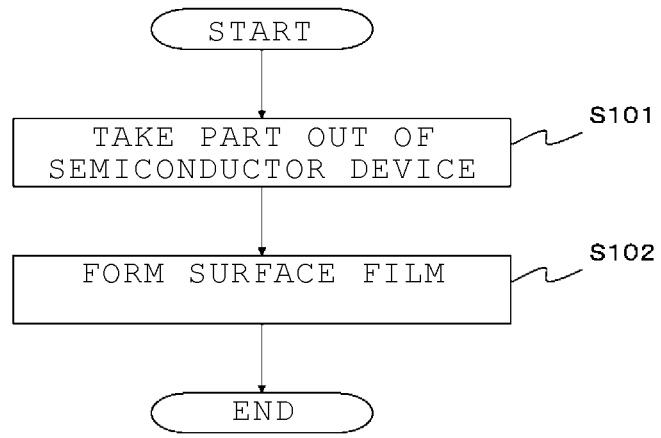
FIG. 3 is a flowchart showing an example of a method for manufacturing the sample according to the first embodiment.

A method for manufacturing the sample according to the present embodiment will be described with reference to FIGS. 3 and 4. FIG. 3 is a flowchart showing an example of the sample manufacturing method according to the first embodiment. FIG. 4 is a process diagram illustrating an example of the sample manufacturing method according to the first embodiment.

Figure 4A:
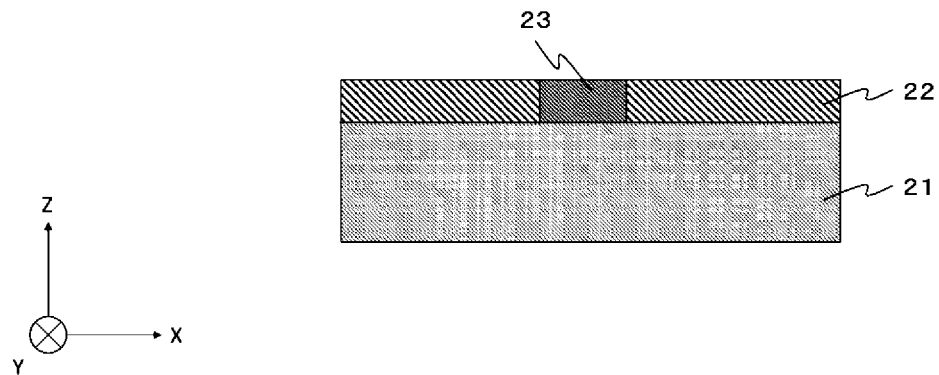
FIGS. 4A and 4B illustrate an example of the method for manufacturing the sample according to the first embodiment.
Figure 4B:
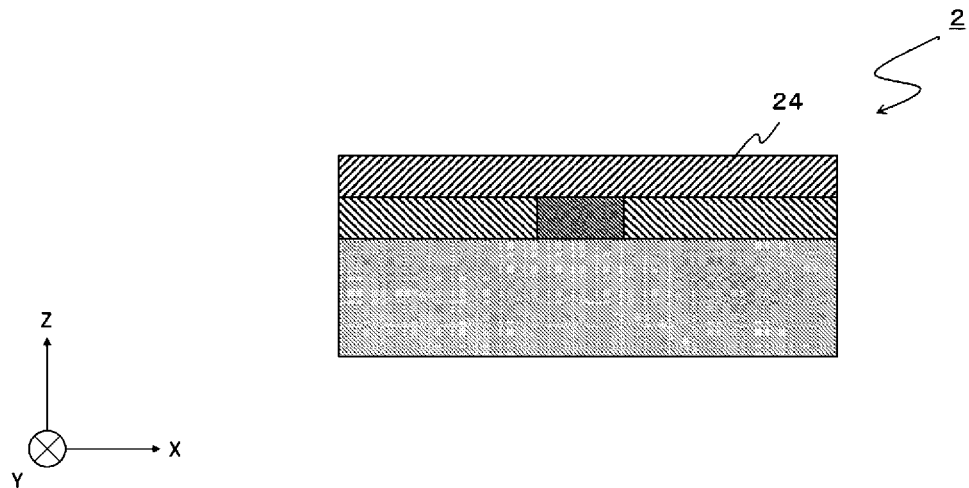

First, as illustrated in FIG. 4A, a part is taken out of the semiconductor device by, for example, processing the semiconductor device with a focused ion beam (FIB) or the like (S101). The part taken out of the semiconductor device has the substrate 21, the non-measurement portion 22, and the measurement portion 23. Then, as illustrated in FIG. 4B, the surface film 24 is formed on the measurement portion 23 and the non-measurement portion 22 (S102). The surface film 24 is formed by, for example, coating, vapor deposition, sputtering, chemical vapor deposition (CVD), or the like. The manufacturing of the sample 2 is completed as a result.

1.3. Sample Analysis Method

FIG. 5 is a flowchart showing a sample measurement method according to the first embodiment.

The sample 2 is set on the sample table 11 (S11). After the sample 2 is set, the AFM-IR device 1 is adjusted, examples of which include optical adjustment and measurement adjustment in the Z-axis direction.

Subsequently, an infrared pulsed laser of a particular wavenumber (or wavelength) is emitted from the IR irradiation unit 12 to the sample 2 (S12). Specifically, the particular wavenumber of the infrared pulsed laser emitted from the IR irradiation unit 12 can be selected from the infrared absorption spectrum to be measured. Here, the sample is irradiated with the infrared pulsed laser of the particular wavelength. When irradiated with an infrared pulsed laser of the particular wavelength, the measurement portion 23 of the sample 2 absorbs the infrared rays. As a result of the infrared absorption, the measurement portion 23 thermally expands and pushes up the surface film 24. The infrared absorption also results in heat diffusion in the measurement portion 23 in addition to the thermal expansion. As a result of the heat diffusion, heat is transferred to the surface film 24 and the surface film 24 thermally expands.

The cantilever 13, the AFM irradiation unit 14, and the AFM light receiving unit 15 detect the displacement of the sample in the Z-axis direction (S13). Since the surface film 24 is higher in coefficient of thermal expansion than the measurement portion 23, the displacement of the cantilever 13 in the Z-axis direction is larger than in a sample in which the surface film 24 is not formed.

The displacement of the cantilever 13 in the Z-axis direction is converted into absorption intensity (S14). As a result, it is possible to obtain the absorption intensity of the measurement portion 23 when the light of the particular wavenumber is irradiated from the IR irradiation unit 12 to the sample 2 containing the measurement portion 23.

Subsequently, it is confirmed whether the infrared pulsed laser whether irradiation has been performed with all wavenumbers in the infrared absorption spectrum scheduled to be measured (S15). If not (S15; NO), the process returns to S12 and steps S12 to S15 are repeated with another wavenumber (or wavelength) in the infrared absorption spectrum to be measured.

If the irradiation has been performed with all wavenumbers in the infrared absorption spectrum scheduled to be measured (S15; YES), the infrared absorption spectrum is output (S16). The measurement of the sample 2 ends as a result.

1.4. Effects

In measuring the infrared absorption spectrum with the AFM-IR device 1, the displacement of the cantilever 13 in the Z-axis direction is converted into absorption intensity, and thus the sensitivity increases as the coefficient of thermal expansion of the measurement portion 23 increases and the sensitivity decreases as the coefficient of thermal expansion of the measurement portion 23 decreases. In the present embodiment, the measurement portion 23 is part of a semiconductor device. In many cases, a semiconductor device is made of, for example, an inorganic material. An inorganic material has a low coefficient of thermal expansion and thus has low sensitivity in infrared absorption spectrum measurement.

In the present embodiment, the surface film 24 using a material higher in coefficient of thermal expansion than the measurement portion 23 is provided on the measurement portion 23. As a result, in addition to the thermal expansion of the measurement portion 23, larger thermal expansion also occurs in the surface film 24 as a result of the heat diffusion from the measurement portion 23. As a result, the displacement of the cantilever 13 in the Z-axis direction increases. Accordingly, in the measurement of the infrared absorption spectrum by the AFM-IR device 1, the measurement sensitivity can be improved even if the measurement portion 23 has a low coefficient of thermal expansion and low sensitivity as in the case of an inorganic material.

In addition, a resin film or the like is used as the surface film 24. In general, a resin has absorption over a wide range of infrared spectrum. However, in the present embodiment, the surface film 24 uses a resin that absorbs little light having wavenumbers in the first wavenumber range. Accordingly, the resin used as the surface film 24 has little effect on the infrared absorption spectrum of the light having wavenumbers in the first wavenumber range in the measurement portion 23 even if the resin has an absorption spectrum in a wide range of the infrared spectrum.

This will be specifically described with reference to FIG. 6. FIG. 6 is a table showing an example of the infrared absorption spectrum. FIG. 6 shows the main types of coupling between the silicon nitride (SiN) that is a material contained in the measurement portion 23 and the epoxy resin that is a material contained in the surface film 24 and the wavenumbers of absorption-observed light in each coupling type. As shown in FIG. 6, silicon nitride (SiN) mainly exhibits infrared absorption of N—H bond, Si—H bond, and Si—N bond. Meanwhile, the epoxy resin of the present embodiment mainly exhibits infrared absorption of O—H bond, C—H bond, C=O bond, and C≡C bond. Accordingly, the epoxy resin absorbing little light having wavenumbers in the range of 2200-2000 cm-1, which is the first wavenumber range in the present embodiment, has little effect on the infrared absorption spectrum of silicon nitride (SiN).

From the above, according to the present embodiment, since the surface film 24 is higher in coefficient of thermal expansion than the measurement portion 23, uses a material in which the second value is less than the first value, and is provided on the measurement portion 23, the effect on the infrared absorption spectrum of the measurement portion 23 can be reduced and the measurement sensitivity can be improved.

2. Second Embodiment

A second embodiment will be described with reference to FIGS. 7 and 8. The second embodiment differs from the first embodiment in that the surface film 24 is provided above and beneath the measurement portion 23. The surface film 24 being provided above and beneath the measurement portion 23 is the only difference of the configuration of the second embodiment from the configuration of the first embodiment, and thus the same parts are denoted by the same reference numerals with redundant detailed description omitted.

2.1. Configuration of Sample

Figure 7:
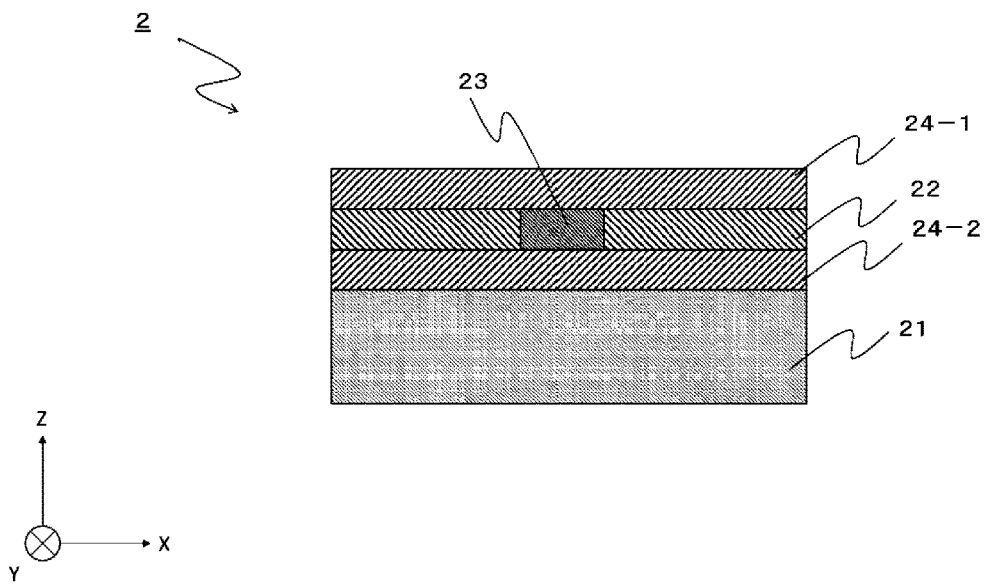
FIG. 7 is a diagram illustrating an example of the configuration of a sample according to a second embodiment.
Figure 8:
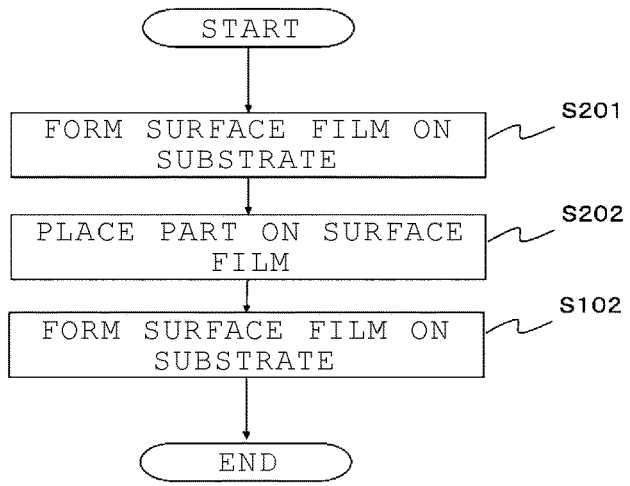
FIG. 8 is a flowchart showing an example of a method for manufacturing the sample according to the second embodiment.

FIG. 7 is a diagram illustrating an example of the configuration of a sample according to the second embodiment. As illustrated in FIG. 7, the sample 2 includes the substrate 21, a second surface film 24-2, the non-measurement portion 22, the measurement portion 23, and a first surface film 24-1. The second surface film 24-2 is provided on the substrate 21. The non-measurement portion 22 and the measurement portion 23 are provided on the second surface film 24-2. The first surface film 24-1 is provided on the non-measurement portion 22 and the measurement portion 23. In other words, in addition to the first embodiment, the second surface film 24-2 is provided between the substrate 21 and the measurement portion 23 in contact with the measurement portion 23.

The first surface film 24-1 and the second surface film 24-2 are higher in coefficient of thermal expansion than the measurement portion 23 in the present embodiment. In addition, as for the first surface film 24-1 and the second surface film 24-2, it is preferable that the absorption intensity of light having wavenumbers in the first wavenumber range is less than the first value. In the present embodiment, the first surface film 24-1 and the second surface film 24-2 are materials containing, for example, an epoxy resin that is a resin. In the present embodiment, the first surface film 24-1 and the second surface film 24-2 are materials containing the same epoxy resin. However, the present disclosure is not limited thereto and surface film 24-1 and the second surface film 24-2 may contain different materials. In addition, although the epoxy resin is used in the present embodiment, the surface film 24-1 and the second surface film 24-2 may be a polycarbonate resin, a polyethylene resin, or the like. Although an example in which the surface film 24-1 and the second surface film 24-2 are materials containing a resin film has been described, the surface film 24-1 and the second surface film 24-2 are not limited to the resin film insofar as the first surface film 24-1 and the second surface film 24-2 are higher in coefficient of thermal expansion than the measurement portion 23 and the second value is less than the first value.

2.2. Sample Manufacturing Method

A method for manufacturing the sample according to the present embodiment will be described with reference to FIGS. 8 and 9. FIG. 8 is a flowchart showing an example of the sample manufacturing method according to the second embodiment. FIG. 9 is a process diagram illustrating an example of the sample manufacturing method according to the second embodiment.

Figure 9A:
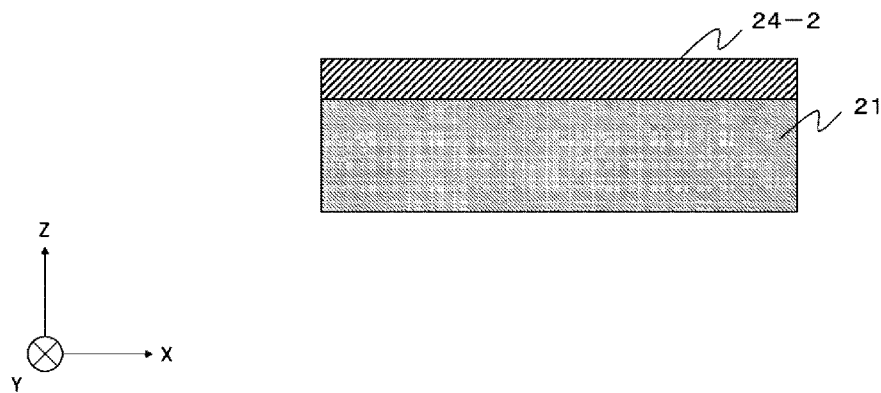
FIGS. 9A-9C illustrate an example of the method for manufacturing the sample according to the second embodiment.

First, as illustrated in FIG. 9A, the second surface film 24-2 is formed on the substrate 21 (S201). The second surface film 24-2 is formed by, for example, coating, vapor deposition, sputtering, CVD, or the like.

Figure 9B:
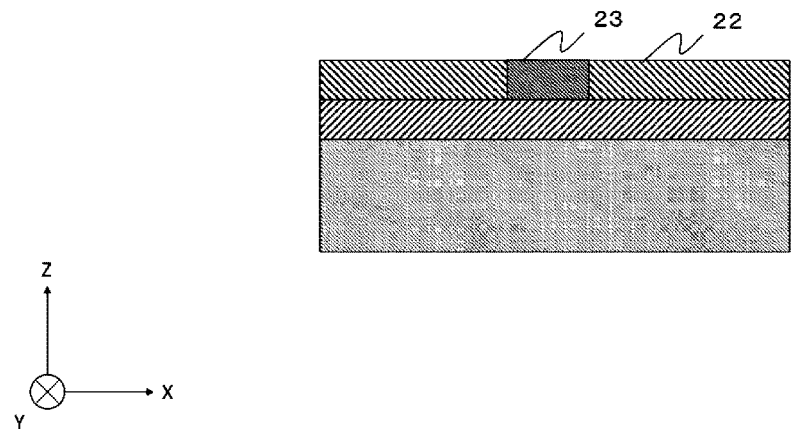

Subsequently, as illustrated in FIG. 9B, the non-measurement portion 22 and the measurement portion 23 are placed on the second surface film 24-2 (S202).

Figure 9C:
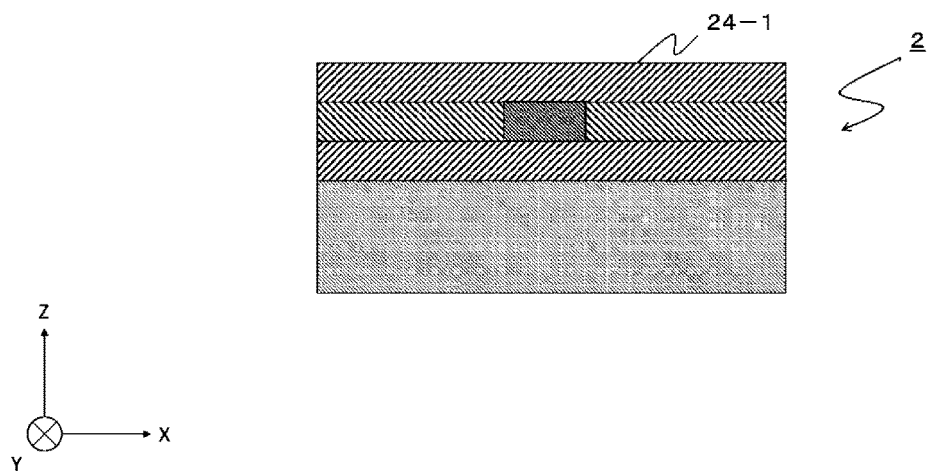

Then, as illustrated in FIG. 9C, the first surface film 24-1 is formed on the measurement portion 23 and the non-measurement portion 22 as in the first embodiment (S102). The manufacturing of the sample 2 is completed as a result.

2.3. Effects

From the above, according to the present embodiment, the same effects as those of the first embodiment can be obtained. In addition, since the second surface film 24-2 beneath the measurement portion 23 is provided in addition to the first surface film 24-1 on the measurement portion 23, the measurement sensitivity can be further improved as compared with the first embodiment.

2.4. Modification

A modification of the second embodiment will be described with reference to FIGS. 10 and 11. The same points and parts as in the second embodiment are denoted by the same reference numerals with redundant detailed description omitted.

Figure 10:
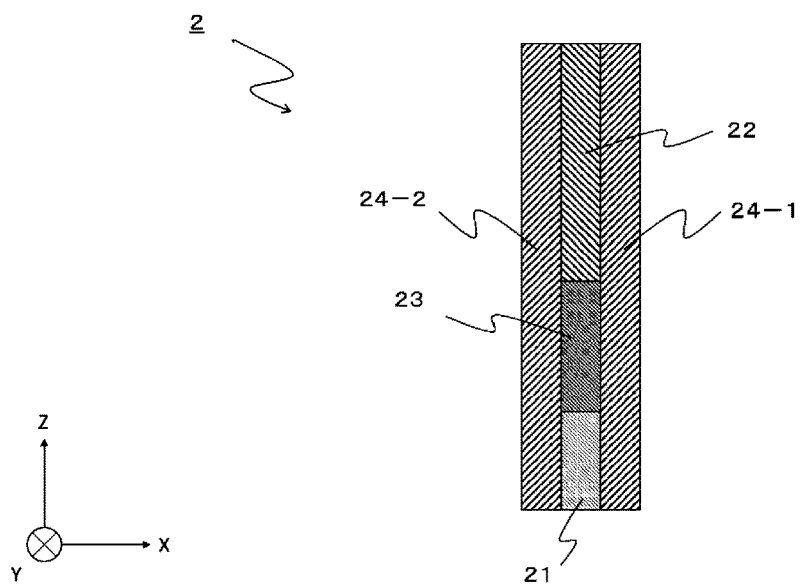
FIG. 10 is a diagram illustrating an example of the configuration of a sample according to a modification.

FIG. 10 is a diagram illustrating an example of the configuration of a sample according to the modification. As illustrated in FIG. 10, the measurement portion 23 is provided on the substrate 21. The non-measurement portion 22 is provided on the measurement portion 23. The first surface film 24-1 and the second surface film 24-2 are adjacently provided on the left and right of the measurement portion 23, respectively.

In performing measurement with the AFM-IR device 1, the sample 2 is set on the sample table 11 such that the first surface film 24-1 and the second surface film 24-2 are positioned on and beneath the measurement portion 23, respectively.

FIG. 11 is a process diagram illustrating an example of a method for manufacturing the sample according to the modification. A flowchart showing an example of the sample manufacturing method of the modification is the same as that in FIG. 3 and thus is omitted.

Figure 11A:
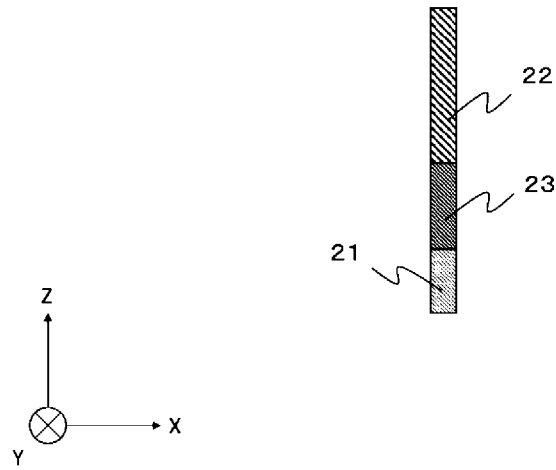
FIGS. 11A-11C illustrate an example of a method for manufacturing the sample according to the modification.
Figure 11B:
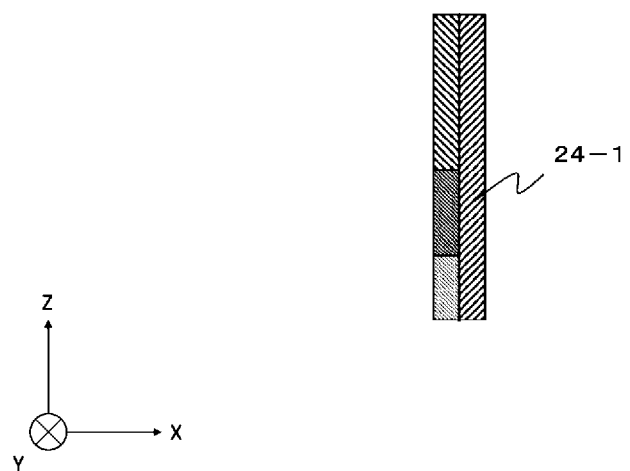
Figure 11C:
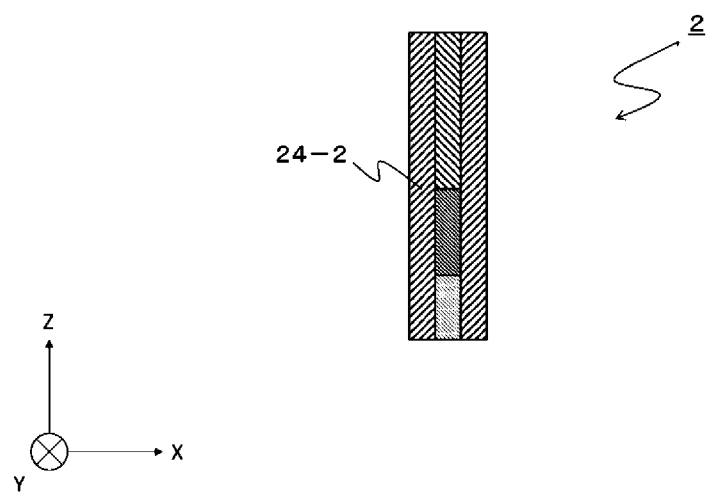

First, as illustrated in FIG. 11A, a part is taken out of the semiconductor device (S101). The part taken out of the semiconductor device has the substrate 21, the non-measurement portion 22, and the measurement portion 23. Then, as illustrated in FIG. 11B, the first surface film 24-1 is formed on the right of the measurement portion 23. As illustrated in FIG. 11C, the second surface film 24-2 is formed on the left of the measurement portion 23 (S102). The first surface film 24-1 and the second surface film 24-2 are formed by, for example, coating, vapor deposition, sputtering, CVD, or the like. The manufacturing of the sample 2 is completed as a result.

3. Third Embodiment

A third embodiment will be described with reference to FIGS. 12 to 14. The third embodiment differs from the first embodiment in terms of surface film material and disposition. The third embodiment differs from the first embodiment only in the surface film material and disposition, and thus the same parts are denoted by the same reference numerals with redundant detailed description omitted.

3.1. Configuration of Sample

Figure 12:
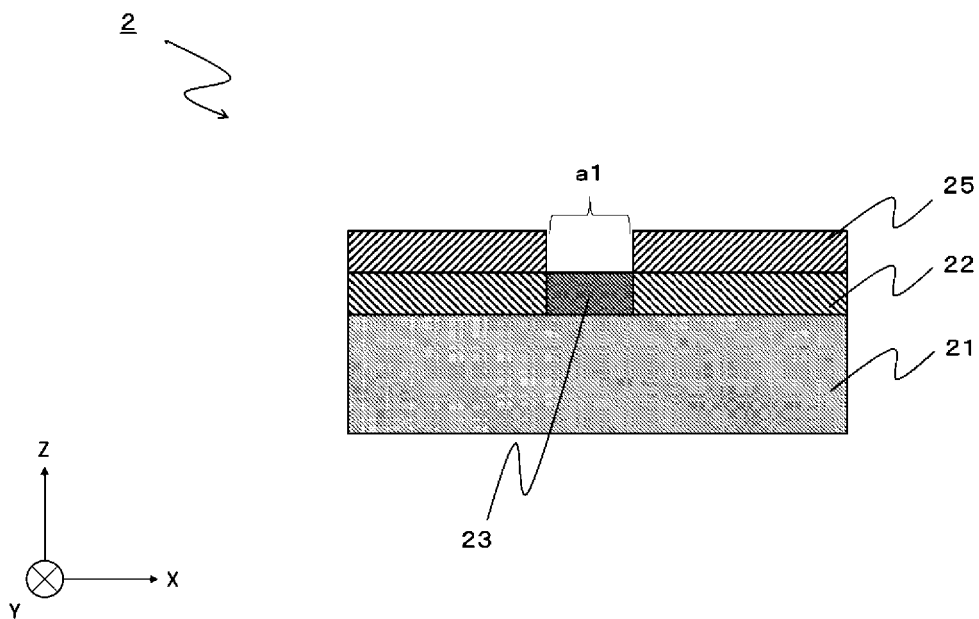
FIG. 12 is a diagram illustrating an example of the configuration of a sample according to a third embodiment.
Figure 13:
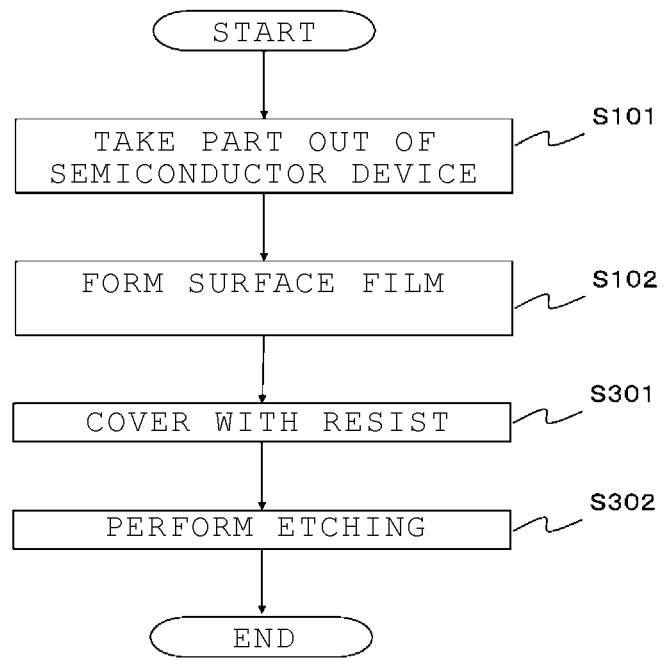
FIG. 13 is a flowchart showing an example of a method for manufacturing the sample according to the third embodiment.

FIG. 12 is a diagram illustrating an example of the configuration of a sample according to the third embodiment.

As illustrated in FIG. 12, the sample 2 includes the substrate 21, the non-measurement portion 22, the measurement portion 23, and a surface film 25. The surface film 25 may be referred to herein as a film, a first film, and a second film. In addition, in the present embodiment, the substrate 21, the non-measurement portion 22, and the measurement portion 23 are a part of a semiconductor device. Although the substrate 21, the non-measurement portion 22, and the measurement portion 23 are a part of the semiconductor device in the present embodiment, the substrate 21, the non-measurement portion 22, and the measurement portion 23 may be any structure including an object of infrared absorption spectrum measurement.

The surface film 25 is formed on the non-measurement portion 22. The surface film 25 is not formed at a first part a1 on the measurement portion 23. This is to promote thermal expansion of the measurement portion 23 in the z-direction. In addition, the probe unit 132 of the cantilever 13 need to reach the measurement portion 23 during measurement. Accordingly, the surface film 25 may be provided on the measurement portion 23 insofar as there is no surface film 25 in the first part a1 such that the probe unit 132 of the cantilever 13 reaches the measurement portion 23 during measurement.

In the present embodiment, the surface film 25 is higher in hardness and Young's modulus than the measurement portion 23. In addition, in the present embodiment, the absorption intensity of the light having wavenumbers in the first wavenumber range in the surface film 25 is a third value. In other words, the third value in the present embodiment is the absorption intensity of the light having wavenumbers in the range of 2200-2000 cm-1 in the surface film 25. Preferably, the third value is less than the first value. More preferably, the third value is 1/10 or less of the first value. In addition, it is further preferable that the third value is 1/100 or less of the first value. Further, it is even more preferable that the third value is 1/1000 or less of the first value.

In the present embodiment, the surface film 25 is a material containing, for example, aluminum oxide (Al2O3). The aluminum oxide (Al2O3) is higher in hardness and Young's modulus than the silicon nitride (SiN) contained in the measurement portion 23. In addition, when the surface film 25 is the material containing the aluminum oxide (Al2O3), the third value can be less than the first value. In the present embodiment, the surface film 25 is higher in hardness and Young's modulus than the measurement portion 23 and the third value is less than the first value. Also, the measurement portion 23 is not limited to a material containing silicon nitride (SiN), and the surface film 25 is not limited to a material containing aluminum oxide (Al2O3). The measurement portion 23 may contain another material in addition to the silicon nitride (SiN). In addition, the surface film 25 may contain another material in addition to the aluminum oxide (Al2O3).

3.2. Sample Manufacturing Method

A method for manufacturing the sample according to the present embodiment will be described with reference to FIGS. 13 and 14. FIG. 13 is a flowchart showing an example of the sample manufacturing method according to the third embodiment. FIG. 14 is a process diagram illustrating an example of the sample manufacturing method according to the third embodiment.

Figure 14A:
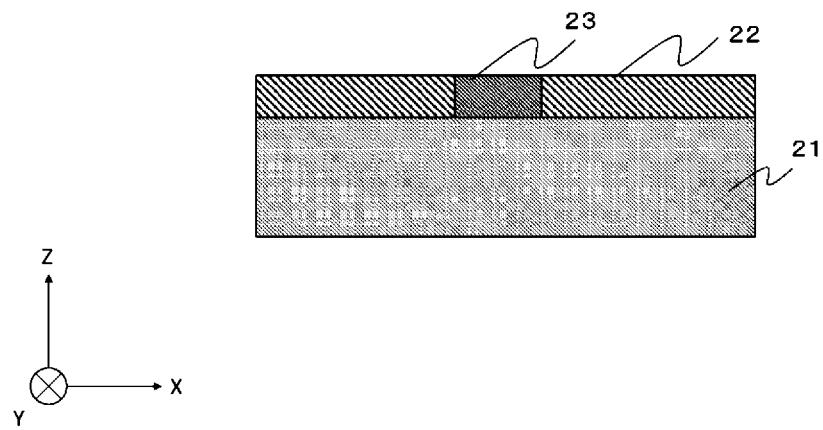
FIGS. 14A-14D illustrate an example of the method for manufacturing the sample according to the third embodiment.
Figure 14B:
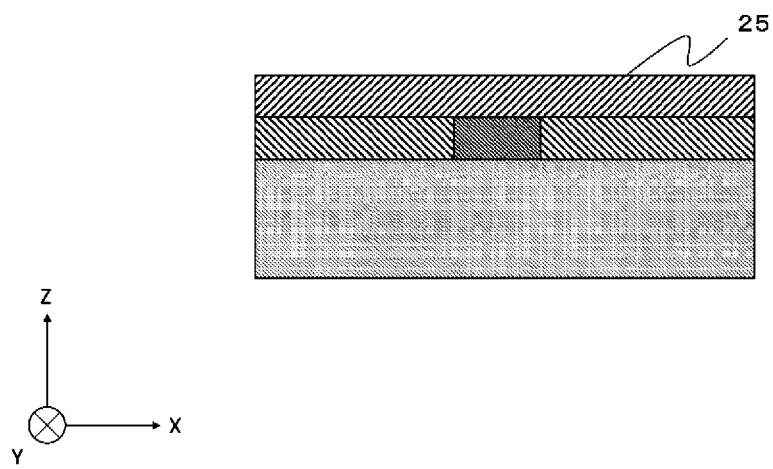

As illustrated in FIGS. 14A and 14B, steps S101 to S102 are common to the first and third embodiments.

Figure 14C:
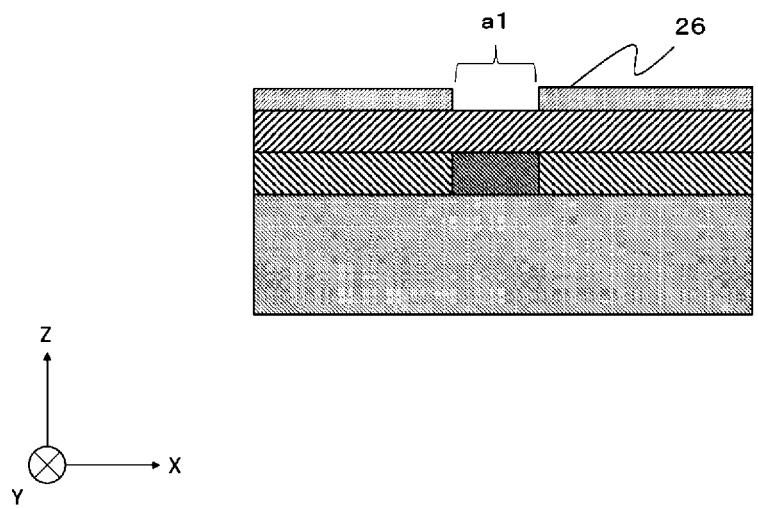

Subsequently, as illustrated in FIG. 14C, the surface film 25 is covered with, for example, a resist 26 so that the surface film 25 at the first part a1 on the measurement portion 23 is removed (S301).

Figure 14D:
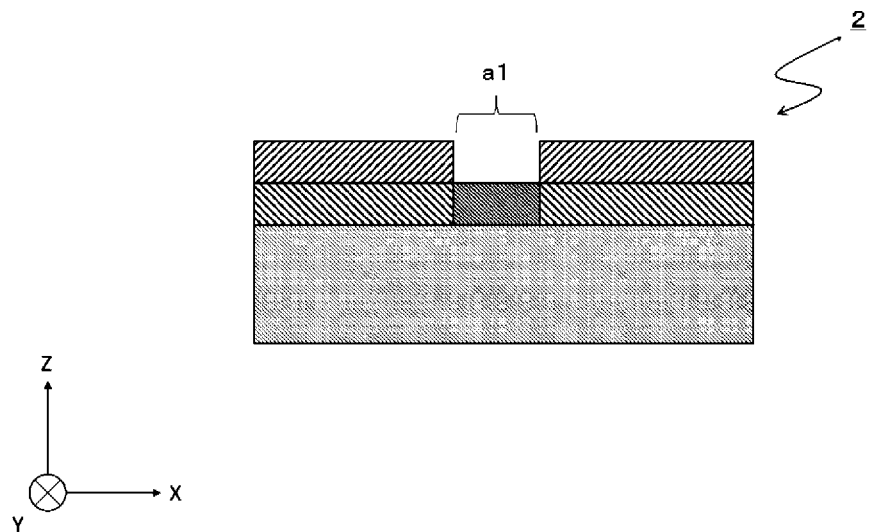

Then, as illustrated in FIG. 14D, etching is performed to remove the surface film 25 at the first part a1 on the measurement portion 23 (S302). The etching is, for example, anisotropic etching. Reactive ion etching (RIE) or the like is used as the anisotropic etching. The resist 26 is removed after the etching. Flattening may be subsequently performed by, for example, chemical mechanical polishing (CMP). The manufacturing of the sample 2 is completed as a result.

3.3. Effects

In the present embodiment, the surface film 25 is formed on the non-measurement portion 22 and the measurement portion 23 with the exception of the first part a1 on the measurement portion 23 and the surface film 25 is higher in hardness and Young's modulus than the measurement portion 23. As a result, when the measurement portion 23 thermally expands, the expansion in the X-axis direction and the Y-axis direction can be prevented with respect to the expansion in the Z-axis direction.

In addition, FIG. 6 shows the main types of coupling of the aluminum oxide (Al2O3) that is a material contained in the surface film 25 in the present embodiment and the wavenumbers of absorption-observed light for each coupling type. As shown in FIG. 6, the aluminum oxide (Al2O3) mainly exhibits infrared absorption of Al—O bond. Accordingly, the light absorption spectrum of aluminum oxide (Al—O) does not overlap with the light absorption spectrum of silicon nitride (SiN) at 2200-2000 cm-1, which is the first wavenumber range of the present embodiment.

According to the present embodiment, the surface film 25 is provided on the non-measurement portion 22 and the measurement portion 23 with the exception of the first part a1 on the measurement portion 23 and the surface film 25 is higher in hardness and Young's modulus than the measurement portion 23. Accordingly, when the measurement portion 23 thermally expands, the direction of the expansion is limited to the Z-axis direction, and thus the measurement sensitivity can be improved. In addition, by providing the surface film 25 using the material in which the third value is less than the first value, the effect on the infrared absorption spectrum of the measurement portion 23 is small and the sensitivity can be enhanced as in the first embodiment.

4. Fourth Embodiment

A fourth embodiment will be described with reference to FIGS. 15 to 17. The fourth embodiment differs from the third embodiment in terms of the disposition of the surface film 25. The fourth embodiment differs from the third embodiment only in the disposition of the surface film 25, and thus the same parts are denoted by the same reference numerals with redundant detailed description omitted.

4.1. Configuration of Sample

Figure 15:
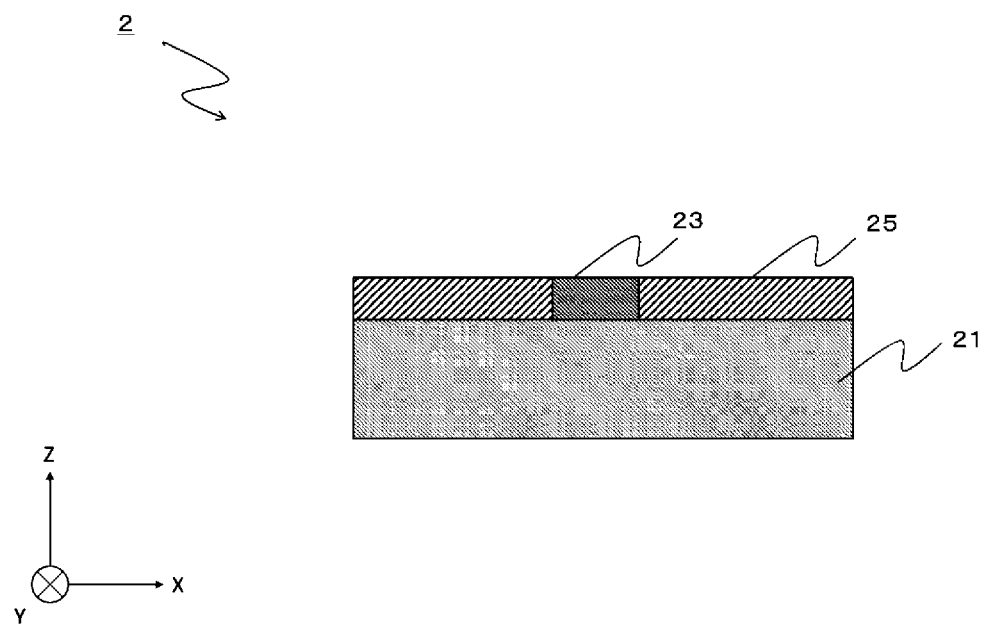
FIG. 15 is a diagram illustrating an example of the configuration of a sample according to a fourth embodiment.
Figure 16:
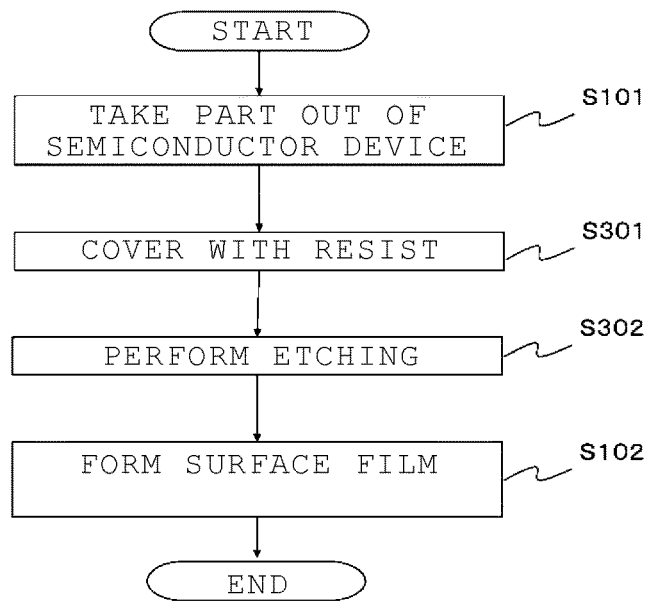
FIG. 16 is a flowchart showing an example of a method for manufacturing the sample according to the fourth embodiment.

FIG. 15 is a diagram illustrating an example of the configuration of a sample according to the fourth embodiment.

As illustrated in FIG. 15, the sample 2 includes the substrate 21, the measurement portion 23, and the surface film 25. In addition, in the present embodiment, the substrate 21 and the measurement portion 23 are a part of a semiconductor device. Although the substrate 21 and the measurement portion 23 are a part of the semiconductor device in the present embodiment, the substrate 21 and the measurement portion 23 are not limited thereto insofar as the substrate 21 and the measurement portion 23 are a structure including an object of infrared absorption spectrum measurement.

The surface film 25 is provided on the substrate 21 and adjacent to the measurement portion 23.

4.2. Sample Manufacturing Method

A method for manufacturing the sample according to the present embodiment will be described with reference to FIGS. 16 and 17. FIG. 16 is a flowchart showing an example of the sample manufacturing method according to the fourth embodiment. FIG. 17 is a process diagram illustrating an example of the sample manufacturing method according to the fourth embodiment.

Figure 17A:
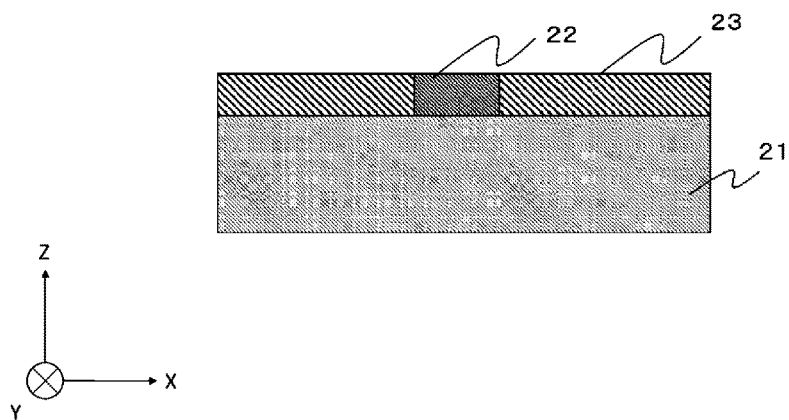
FIGS. 17A-17D illustrate an example of the method for manufacturing the sample according to the fourth embodiment.

As illustrated in FIG. 17A, a part is taken out of a semiconductor device as in step S101 of the first embodiment.

Figure 17B:
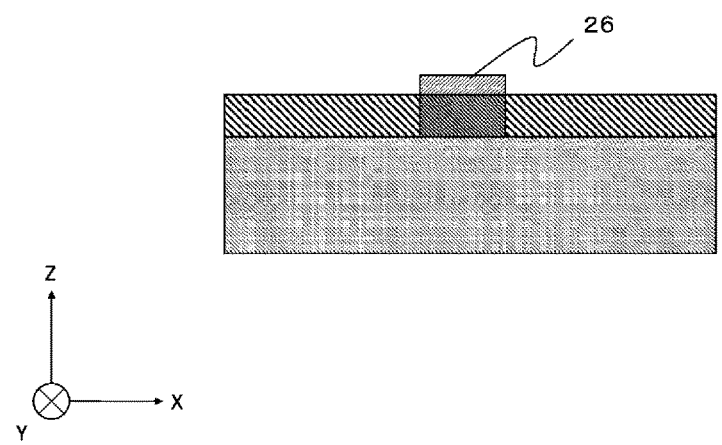

Subsequently, as illustrated in FIG. 17B, the measurement portion 23 is covered from above with, for example, the resist 26 (S301).

Figure 17C:
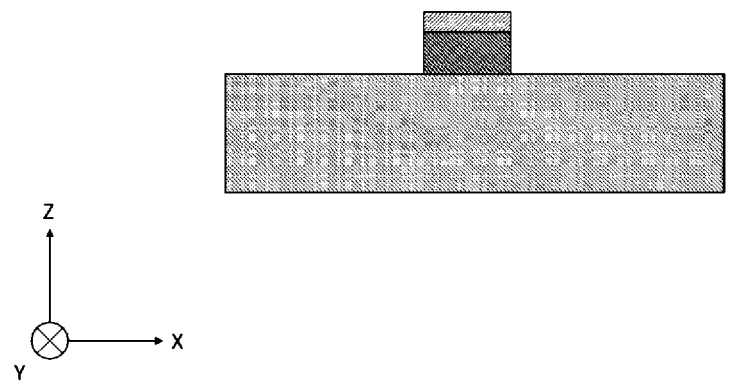

Then, as illustrated in FIG. 17C, etching is performed to remove the non-measurement portion 22 (S302). In removing the non-measurement portion 22, up to a part of the substrate 21 may be removed.

Figure 17D:
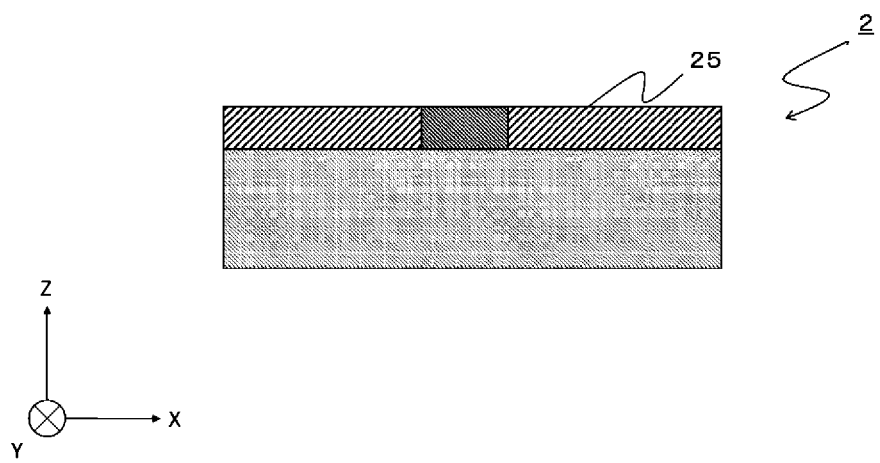

After the resist 26 is removed, the surface film 25 is formed on the substrate 21 as illustrated in FIG. 17D (S102). Flattening may be performed by, for example, CMP. The manufacturing of the sample 2 is completed as a result.

4.3. Effects

From the above, according to the present embodiment, the same effects as those of the third embodiment can be obtained. In addition, since the surface film 25 high in hardness and Young's modulus is provided adjacent to the measurement portion 23, the expansion of the measurement portion 23 in the X-axis direction and the Y-axis direction can be prevented with respect to the expansion of the measurement portion 23 in the Z-axis direction as compared with the third embodiment, and thus the measurement sensitivity can be improved.

5. Fifth Embodiment

A fifth embodiment will be described with reference to FIGS. 18 to 20. The fifth embodiment differs from the fourth embodiment in terms of the disposition of the surface film 25. The fifth embodiment differs from the fourth embodiment only in the disposition of the surface film 25, and thus the same parts are denoted by the same reference numerals with redundant detailed description omitted.

5.1. Configuration of Sample

Figure 18:
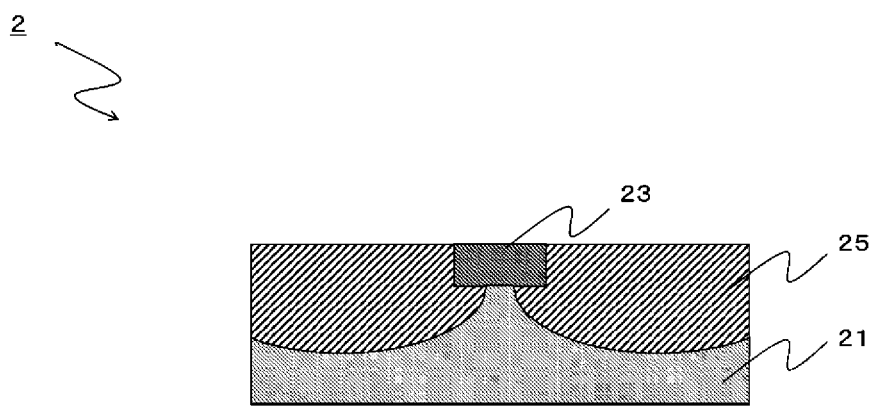
FIG. 18 is a diagram illustrating an example of the configuration of a sample according to a fifth embodiment.
Figure 19:
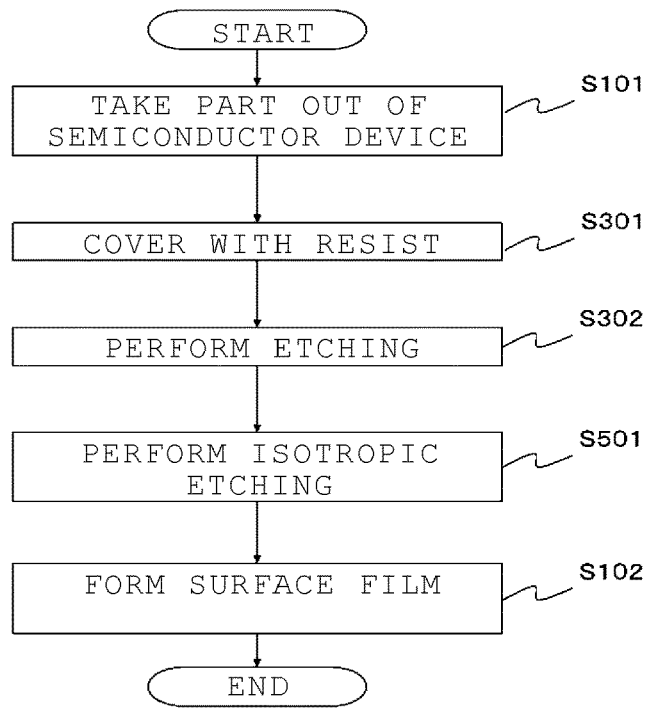
FIG. 19 is a flowchart showing an example of a method for manufacturing the sample according to the fifth embodiment.

FIG. 18 is a diagram illustrating an example of the configuration of a sample according to the fifth embodiment.

As illustrated in FIG. 18, the sample 2 includes the substrate 21, the measurement portion 23, and the surface film 25. In addition, in the present embodiment, the substrate 21 and the measurement portion 23 are a part of a semiconductor device. Although the substrate 21 and the measurement portion 23 are a part of the semiconductor device in the present embodiment, the substrate 21 and the measurement portion 23 may be any structure including an object of infrared absorption spectrum measurement.

The surface film 25 is provided on the substrate 21. In addition, the surface film 25 is provided adjacent to the measurement portion 23. Further, the surface film 25 is provided beneath the measurement portion 23 in contact with the measurement portion 23. In other words, the surface film 25 is provided in contact with the lower, left, and right sides of the measurement portion 23.

5.2. Sample Manufacturing Method

A method for manufacturing the sample according to the present embodiment will be described with reference to FIGS. 19 and 20. FIG. 19 is a flowchart showing an example of the sample manufacturing method according to the fifth embodiment. FIG. 20 is a process diagram illustrating an example of the sample manufacturing method according to the fifth embodiment.

Figure 20A:
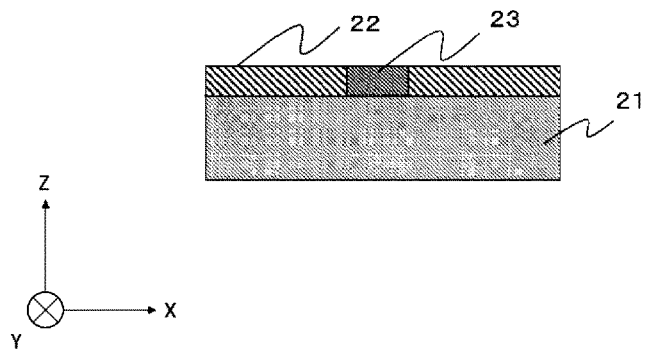
FIGS. 20A-20E illustrate an example of the method for manufacturing the sample according to the fifth embodiment.
Figure 20B:
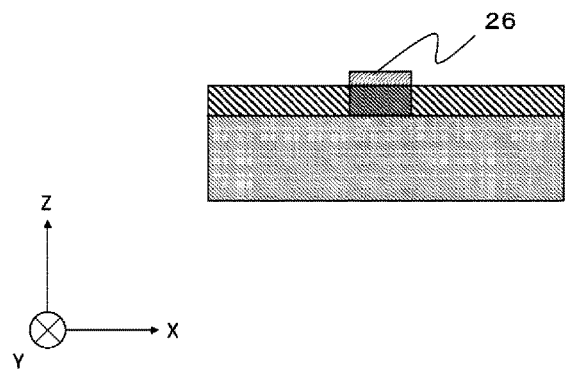

As illustrated in FIGS. 20A and 20B, steps S101 to S301 are common to the fourth embodiment.

Figure 20C:
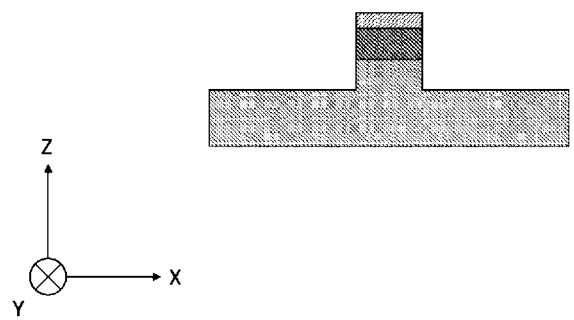

Subsequently, as illustrated in FIG. 20C, in step S302 in the present embodiment, the non-measurement portion 22 and the substrate 21 at the part where the non-measurement portion 22 is provided are removed by etching (S302). The etching is performed until the substrate 21 at the part previously provided with the non-measurement portion 22 becomes lower than the substrate 21 at the part provided with the measurement portion 23. The etching is, for example, anisotropic etching. RIE or the like is used as the anisotropic etching.

Figure 20D:
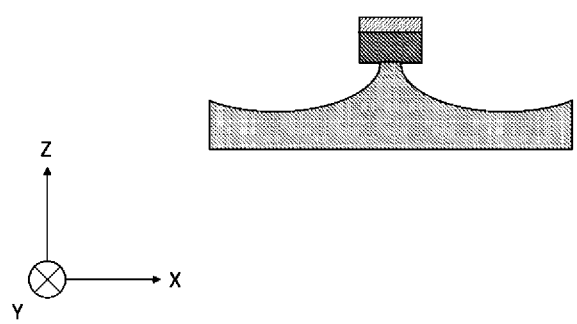

Subsequently, isotropic etching is performed as illustrated in FIG. 20D (S501). As an example of the isotropic etching, wet etching by immersion in an etching solution is used. As a result of the isotropic etching, a part of the substrate 21 beneath the measurement portion 23 is removed and the X-direction width of the substrate 21 beneath the measurement portion 23 decreases. In addition, the substrate 21 at the part previously provided with the non-measurement portion 22 is also removed in part.

Figure 20E:
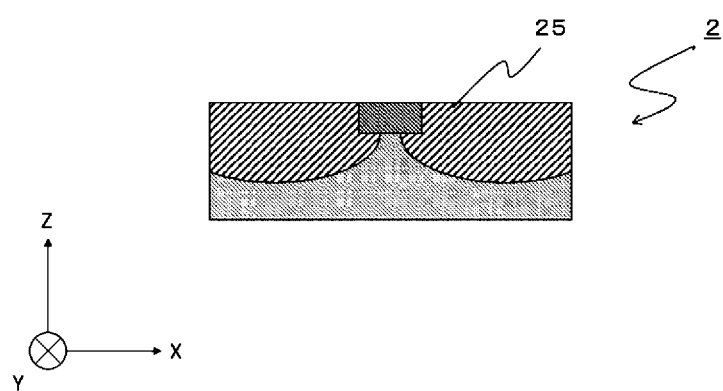

Then, after the resist 26 is removed, the surface film 25 is formed on the substrate 21 as illustrated in FIG. 20E (S102). As a result, the surface film 25 is provided adjacent to the measurement portion 23 on the lower, left, and right sides of the measurement portion 23. Flattening is performed by, for example, CMP. The manufacturing of the sample 2 is completed as a result.

5.3. Effects

From the above, according to the present embodiment, the same effects as those of the fourth embodiment can be obtained. In addition, since the surface film 25 higher in hardness and Young's modulus than the measurement portion 23 is provided on the lower side as well as the left and right sides of the measurement portion 23, thermal expansion in the negative Z-axis direction is prevented as compared with the fourth embodiment, the direction of expansion of the measurement portion 23 is limited by the positive Z-axis direction, and thus the measurement sensitivity can be improved.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A sample for atomic force microscopy-based infrared spectroscopy comprising:
    a substrate;
    a measurement portion provided on the substrate and having a first light absorption intensity when a light of a first wavelength is irradiated thereon; and
    a first film provided on the measurement portion and having a higher coefficient of thermal expansion than the measurement portion and a second light absorption intensity, which is less than the first light absorption intensity, when the light of the first wavelength is irradiated thereon.

2. The sample according to claim 1, wherein the first film has a thickness of 5 nm or more and 2 um or less.

3. The sample according to claim 1, wherein the measurement portion is an inorganic material, and the first film is a resin.

4. The sample according to claim 3, wherein the measurement portion is silicon nitride and the first film is an epoxy resin.

5. The sample according to claim 1, further comprising a non-measurement portion adjacent to the measurement portion and between the first film and the substrate,
wherein the measurement portion and the non-measurement portion are each a silicon nitride and the measurement portion has a width of more than 30 nm.

6. The sample according to claim 1, further comprising a second film between the substrate and the measurement portion and in contact with the measurement portion, the second film having a higher coefficient of thermal expansion than the measurement portion and a third light absorption intensity, which is less than the first light absorption intensity, when the light of the first wavelength is irradiated thereon.

7. The sample according to claim 1, wherein the second light absorption intensity is $1/10$ or less of the first light absorption intensity.

8. A method for manufacturing the sample according to claim 1, wherein the first film is formed on the measurement portion.

9. A method for manufacturing the sample according to claim 6, wherein the second film is formed on the substrate, the measurement portion is placed on the second film, and the first film is formed on the measurement portion.

10. A method for measuring an infrared absorption spectrum:
irradiating an infrared light to the sample according to claim 1; and
detecting an amount of displacement of an upper surface of the sample in response to the irradiating.

11. A sample for atomic force microscopy-based infrared spectroscopy comprising:
a substrate;
a measurement portion provided on the substrate and having a first light absorption intensity when a light of a first wavelength is irradiated thereon; and
a film provided above a non-measurement portion adjacent to the measurement portion, the film having a higher Young's modulus than the measurement portion and a second light absorption intensity, which is less than the first light absorption intensity, when the light of the first wavelength is irradiated thereon.

12. The sample according to claim 11, wherein the film is not provided above the measurement portion.

13. The sample according to claim 11, wherein the film is aluminum oxide.

14. The sample according to claim 11, wherein the second light absorption intensity is $1/10$ or less of the first light absorption intensity.

15. A method for manufacturing the sample according to claim 11, wherein the film is formed on the measurement portion and the non-measurement portion and the film on the measurement portion is removed.

16. A method for measuring an infrared absorption spectrum:
irradiating an infrared light to the sample according to claim 11; and
detecting an amount of displacement of an upper surface of the sample.

17. A sample for atomic force microscopy-based infrared spectroscopy comprising:
a substrate;
a measurement portion provided on the substrate and having a first light absorption intensity when a light of a first wavelength is irradiated thereon; and
a film provided adjacent to the measurement portion, the film having a higher Young's modulus than the measurement portion and a second light absorption intensity, which is less than the first light absorption intensity, when the light of the first wavelength is irradiated thereon.

18. The sample according to claim 17, wherein the film is also provided beneath the measurement portion and in contact with the measurement portion.

19. A method for manufacturing the sample according to claim 18, wherein a part of the substrate beneath the measurement portion is removed and the film is formed in the removed portion of the substrate and adjacent to the measurement portion.

20. A method for manufacturing the sample according to claim 17, wherein the film is formed on the substrate adjacent to the measurement portion.

* * * * *